United States Patent [19]

Grove et al.

[11] Patent Number: 4,884,358
[45] Date of Patent: Dec. 5, 1989

[54] FISHING LURE

[76] Inventors: Darryl D. Grove; Brenda D. Grove, both of 2101 Lexington, Beeville, Tex. 78102

[21] Appl. No.: 310,877

[22] Filed: Feb. 16, 1989

[51] Int. Cl.⁴ .............................................. A01K 85/00
[52] U.S. Cl. .................................................. 43/42.13
[58] Field of Search .................. 43/42.13, 42.19, 42.11

[56] References Cited

U.S. PATENT DOCUMENTS

| | | | |
|---|---|---|---|
| 1,547,619 | 7/1925 | Shannon | 43/42.13 |
| 4,033,065 | 7/1977 | Shannon | 43/42.13 |
| 4,037,345 | 7/1977 | DuBois | 43/42.13 |
| 4,510,710 | 4/1985 | Hanna | 43/42.13 |
| 4,718,191 | 1/1988 | Gentry | 43/42.13 |
| 4,794,721 | 1/1989 | Rowe | 43/42.13 |

Primary Examiner—Gene P. Crosby
Attorney, Agent, or Firm—Leon Gilden

[57] ABSTRACT

A fishing lure is set forth including a trio of spinning type lures for use especially to attract the category of fish known as Bass. The invention includes an upwardly and rearwardly extending first spinning lure of a first dimension rotatably mounted to an upper leg with a rearwardly extending horizontal leg terminating with a weighted head member with a plurality of further spinning lures rotatably mounted to wing legs positioned at an obtuse angle relative to one another. A modified form of the invention utilizes each of the spinning lures of different size, weight, and configuration to effect a random wobbling motion to the entire lure assembly.

10 Claims, 1 Drawing Sheet

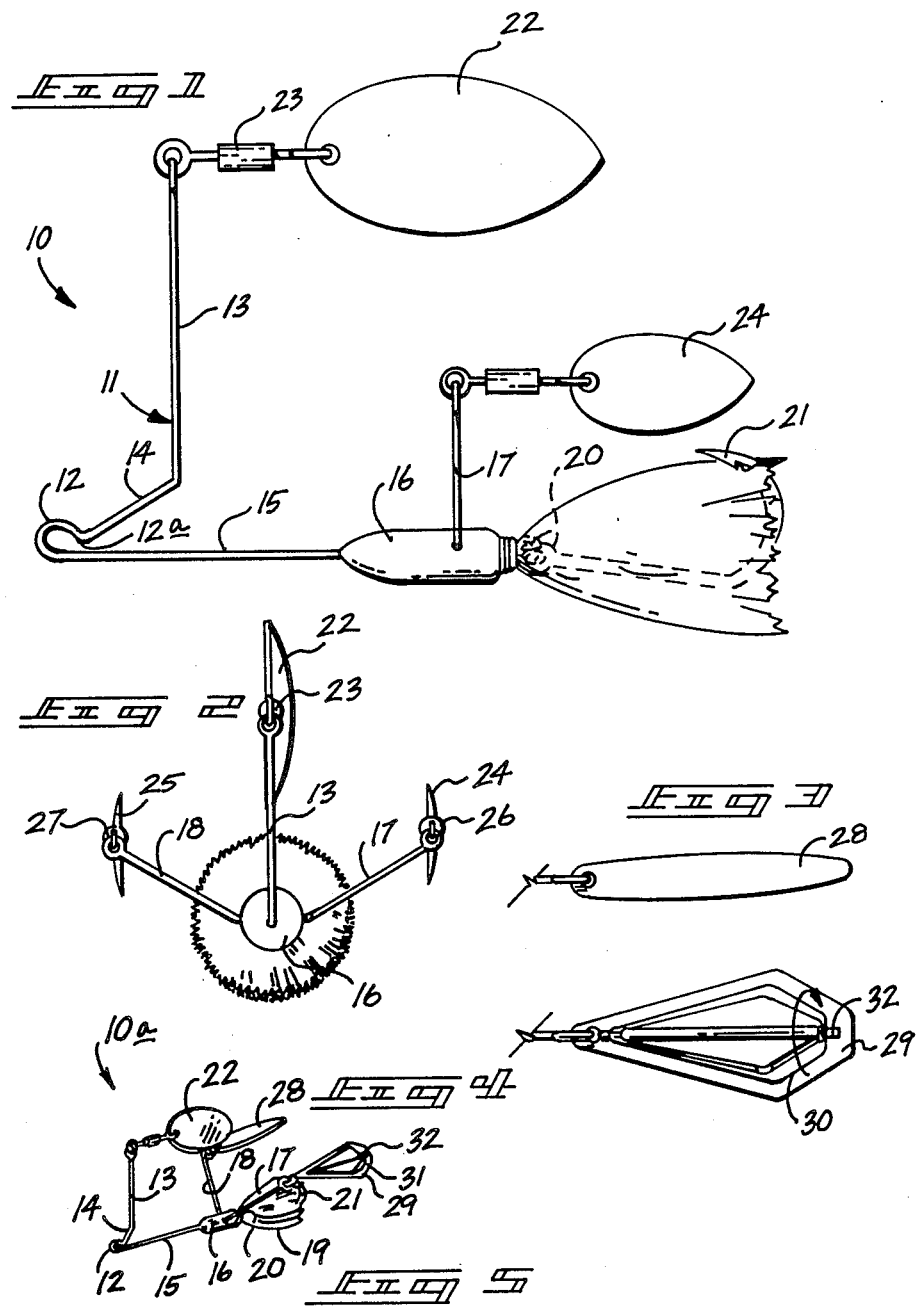

FISHING LURE

BACKGROUND OF THE INVENTION

1. Field of the Invention

The field of invention relates fishing lures, and more particularly pertains to a new and improved fishing lure wherein the same simulates a school of fish to attract game fish thereto, and particularly Bass-type game fish.

1. Description of the Prior Art

The use of various type lures for various and particular applications is well known in the prior art. More particularly, the sport of game fishing is geographically developed within various and scattered parts of the nation applicable to the various unique fishing circumstances to be found. The applicability of various lures to unique geographical sites has heretofore required the utilization of multiple lures to attract Bass-type game fish. The simulation of a swimming school to attract a Bass-type game fish has been found to be highly effective and to this extent, the prior art has failed to appropriately set forth this relationship. For example, U.S. Pat. No. 4,209,932 to Pate sets forth a typical spinning bait lure with a first upwardly extending leg and a lower leg wherein the lower leg includes a hook and the upper leg includes a plurality of fishing lures to attract fish. The Pate lure is of a relatively remote organization relative to the instant invention simulating a school of swimming fish.

U.S. Pat. No. 4,458,884 to Opperman sets forth a fishing lure provided with a weighted hook positioned at one end of a bifurcated leg organization to effect pivoting of the lure and a spinner about an access to attract a fish thereto.

U.S Pat. No. 4,571,877 to Montgomery sets forth a rigid bifurcated plurality of legs with a hook at the end of one leg and a spinner at the end of the other leg to rotatably pivot relative to an associated fishing line to attract fish thereto.

U.S. Pat. No. 4,625,448 to Borders sets forth a spinner bait utilizing the fishing line secured about a bushing to minimize frictional wear in the line as the lure rotates relative to the line wherein the lure is of a conventional bifurcated leg assembly.

U.S. Pat. No. 4,640,041 to Stanley sets forth a further example of a "V" shaped fishing lure utilizing a weighted hook with a skirt at the end of one leg with a pluralitY of spinners at the end of the second leg for attracting game fish.

As such, it may be appreciated that there is a continuing need for a new and improved fishing lure which addresses both the problems of simulating a school of fish while simultaneously including capability of effecting a random wobbling motion to attraot game fish.

SUMMARY OF THE INVENTION

In view of the foregoing disadvantages inherent in the known types of fishing lures now present in the prior art, the present invention provides a fishing lure wherein the same utilizes a trio of spinners at various orientations relative to a fishing hook to simulate a school of fish to attract a game fish thereto. As such, the general purpose of the present invention, which will be described subsequently in greater detail, is to provide a new and improved fishing lure which has all the advantages of the prior art fishing lures and none of the disadvantages.

To attain this, the present invention comprises a fishing lure of a wire skeleton organization utilizing an upwardly extending leg supporting a first weighted lure with a rearwardly extending horizontal leg terminating in a weighted head including a plurality of further wing arms extending outwardly of the weighted head to secure a further spinner at the end of each leg wherein each spinner is of a lesser weight and configuration than the first spinner. A hook and associated skirt is positioned rearwardly of the weighted head. A modification of the instant invention utilizes a trio of spinners of various sizes, weights, and configuration to effect a random wobbiing motion to attract a game fish thereto.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing lure which has all the advantages of the prior art fishing lures and none of the disadvantages.

It is another object of the present invention to provide a new and improved fishing lure which may be easily and efficiently manufactured and marketed.

It is a further object of the present invention to provide a new and improved fishing lure which is of a durable and reliable construction.

An even further object of the present invention is to provide a new and improved fishing lure which is susceptible of a low cost of manufacture with regard to both materials and labor, and which accordingly is then susceptible of low prices of sale to the consuming public, thereby making such fishing lure economically available to the buying public.

Still yet another object of the present invention is to provide a new and improved fishing lure which provides in the apparatuses and methods of the prior art some of the advantages thereof, while simultaneously overcoming some of the disadvantages normally associated therewith.

Still another object of the present invention is to provide a new and improved fishing lure wherein the same effects random motion to the lure to attract game fish while simultaneously simulating a school of fish to further attract game fish to the lure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view taken in elevation of the instant invention.

FIG. 2 is an orthographic frontal view taken in elevation of the instant invention.

FIG. 3 is an orthographic view taken in elevation of a further spinning lure utilized by the instant invention.

FIG. 4 is an orthographic view taken in elevation of still further fishing lure utilized by the instant invention.

FIG. 5 is an isometric illustration of a modification of the instant invention.

DESCRIPTION OF THE PREFERRED EMBODIMENT

With reference now to the drawings, and in particular to FIGS. 1 to 5 thereof, a new and improved fishing lure embodying the principles and concepts of the present invention and generally designated by the reference numerals 10 and 10a will be described.

More specifically, it will be noted that the fishing lure apparatus 10 essentially comprises a wire skeleton 11 including a forwardly extending open eye 11 formed with a constricted entrance 12a wherein an upper leg 13 extends vertically upwardly relative to the entrance 12a with an angulated transition leg 14 joining the upper leg 13 and the open eye 12 and oriented at forty-five degrees relative to a horizontal trailing leg 15 extending rearwardly and orthogonally relative to the upper leg 13 originating from the open eye 12. The horizontal trailing leg 15 terminates rearwardly with an elongate weighted head member 16 formed with a forward conical nose. The weighted head member is typically of one-half ounce and it should be understood that in the attraction of Bass-type fishing game, 0.040 diameter wire is utilized for the skeleton framework 11.

A first wing leg 17 and a second wing leg 18 are orthogonally and outwardly oriented and secured relative to the head member 16 with an obtuse included angle defined between the first and second wing legs 17 and 18. A rearwardly extending filament skirt 19 originates at the rearward face of the head member 16 wherein the skirt is formed typically of a resilient polymeric fibrous material. A loop is positioned medially of the forward apex of the conical configured skirt 19 to enable securement of a hook 21 thereto wherein the hook is of a length substantially equal to that of the skirt 19. The first spinner 22 secured to the upper terminal end of the upper leg 13 is of a first dimension, and typically a number 6 "willow leaf" is utilized wherein a first ball-bearing swivel 23 of a number 1 is utilized. A second spinner 24 and a third spinner 25 of typically equal size and configuration, but less than that of the first spinner 22, are secured to the outer terminal ends of the first and second wing legs 17 and 18 wherein the second and third spinners 24 and 25 are of a weight and configuration less than that of the first spinner 22, although equal to each other. The second and third ball bearing swivels 26 and 27 are also of a number 1 category to pivotally secure the various swivels 22, 24, and 25 to the various terminal ends of the skeleton 11.

FIGS. 3 and 4 illustrate further spinners utilized in the modified fishing lure 10a of the instant invention. The fourth spinner 28 is of an elongate and reduced width relative to the first, second, and third spinners and of lesser weight than the first, second, and third spinners wherein the fifth spinner 29 of FIG. 4 is of a generally polygonal configuration with a polygonal central opening 30 mounting a rotating spinner blade 31 of a complementary configuration to the polygonal opening 80 and rotatable about an elongate axle 32 mounted lengthwise of the fifth spinner 29. The fifth spinner 29 is of a weight and size medially to those of the first and fourth spinners 22 and 28 respectively.

In the modified aspect of the invention as illustrated in FIG. 5, the fourth and fifth spinners 28 and 29 are mounted at respective outer terminal ends of the second and first wing legs 18 and 17 respectively wherein the effect of the unbalanced spinners effect a random wobbling motion to the entire lure assembly to further enhance the attraction of game fish thereto, as well as simulating the characteristics of a school of bait fish in the use of a lure 10a. Further, it should be understood that the orientation of the upwardly extending leg, as viewed in FIG. 2, bisects the obtuse angle defined between the outwardly extending wings 17 and 18.

As to the manner of usage and operation of the instant invention, the same should be apparent from the above description and accordingly no further discussion relative to the manner of usage and operation shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and descriped, and accordingly, all suitable modifications and equivalents may be resorted to, falling within the scope of the invention.

What is claimed as being new and desired to be protected by LETTERS PATENT of the United States is as follows:

1. A fishing lure comprising,
  a wire skeleton body including a securement eye defining a forward loop with a first upwardly extending leg joined to said loop and extending upwardly of said loop,
  and a rearwardly extending leg joining said loop and extending rearwardly of said loop,
and
said rearwardly extending leg terminatin rearwardly and remotely of said loop with an enlarged head member,
and
a first and second wing leg extending outwardly and orthogonally relative to said head member,
and
a hook pivotally mounted rearwardly of said head member,
and
a first spinner pivotally mounted to a free end of said upwardly extending leg,
and
a second spinner pivotally mounted to a free end of said first wing leg,
and
a third spinner pivotally mounted to a free end of said second wing leg.

2. A fishing lure as set forth in claim 1 wherein said head member defines an enlarged weighted member of a diameter substantially greater than that of said rearwardly extending leg and of a generally cylindrical configuration with a forward conical portion secured to said rearwardly extending leg, and said first wing leg and said second leg are orthogonally secured to said head member relative to an axis defined by said head member.

3. A fishing lure as set forth in claim 2 wherein an included angle between said first wing leg and said second wing leg is an obtuse angle, and said upwardly extending leg extends orthogonally upwardly relative to said rearwardly extending leg and bisects said obtuse angle.

4. A fishing lure as set forth in claim 3 wherein said upwardly extending leg member includes a transition member secured between said loop and an upwardly extending leg wherein said transition member is inclined at an angle of forty-five degrees relative to said rearwardly extending leg.

5. A fishing lure as set forth in claim 4 wherein said first spinner is of a first weight and first configuration wherein said second spinner is of a second weight and second configuration and wherein said third spinner is of a third weight and third configuration. and wherein the second and third spinners are of a lesser weight and lesser configuration than that defined by the first spinner.

6. A fishing lure as set forth in claim 5 further including a skirt extending rearwardly of the rear surface of said head member and of a length substantially equal to said hook.

7. A fishing lure as set forth in claim 6 wherein the second spinner is of a lesser weight and lesser configuration than the weight and configuration defined by said third spinner.

8. A fishing lure as set forth in claim 7 wherein said third spinner defines a polygonal configuration including an axially mounted rotatable wing rotatably mounted within an opening of said third spinner.

9. A fishing lure as set forth in claim 8 wherein said skeleton body is formed of wire of 0.040 inch diameter 10. A fishing lure as set forth in claim 6 wherein said second spinner is of a weight and configuration substantially equal to that weight and configuration defined by said third spinner.

* * * * *